Oct. 6, 1964  S. B. THOMAS  3,152,197
HYDROCARBON ISOMERIZATION PROCESS
Filed Dec. 28, 1962  3 Sheets-Sheet 1

INVENTOR:
SAMUEL B. THOMAS
BY: Robert C. Clement
HIS ATTORNEY

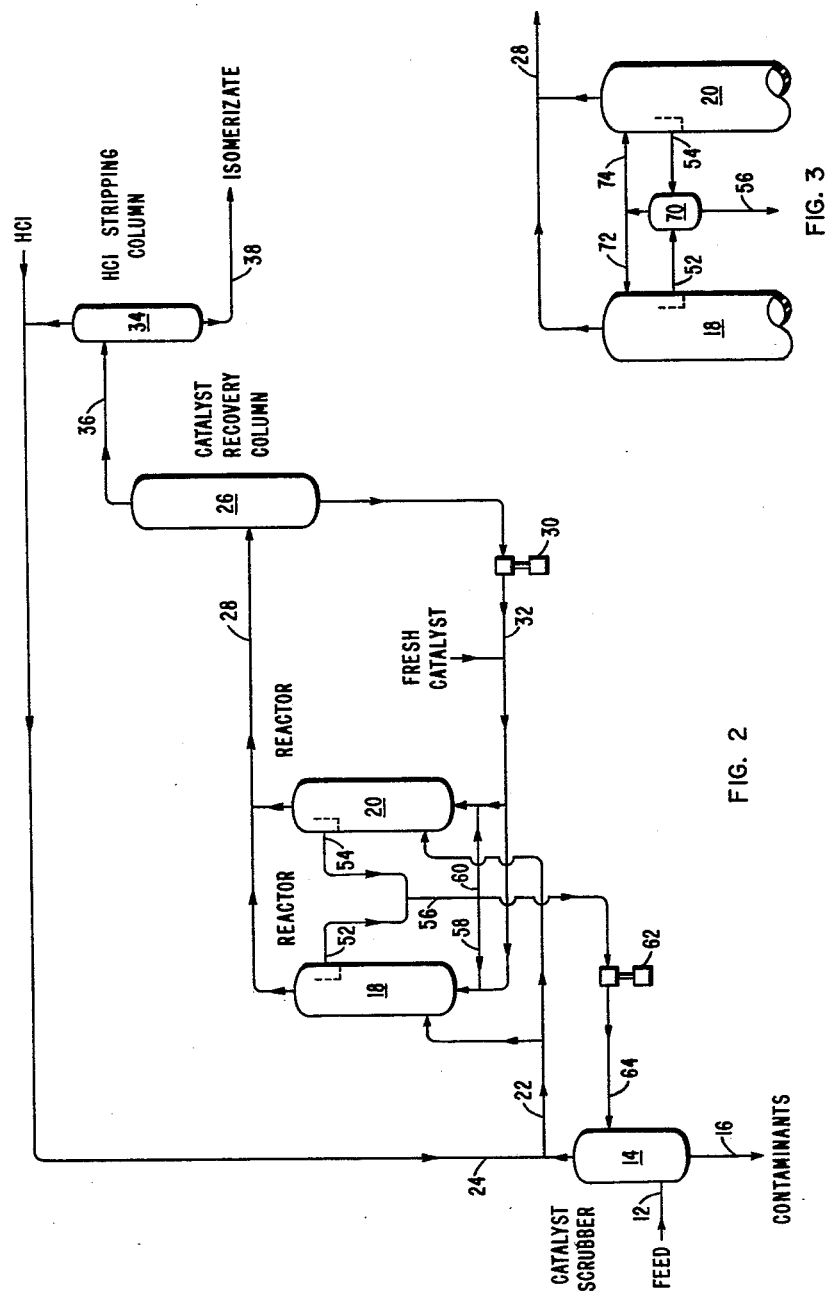

Oct. 6, 1964  S. B. THOMAS  3,152,197
HYDROCARBON ISOMERIZATION PROCESS
Filed Dec. 28, 1962  3 Sheets-Sheet 3

INVENTOR:
SAMUEL B. THOMAS
BY: *Robert C. Clement*
HIS ATTORNEY

United States Patent Office 3,152,197
Patented Oct. 6, 1964

3,152,197
HYDROCARBON ISOMERIZATION PROCESS
Samuel B. Thomas, Long Beach, Calif., assignor to Shell Oil Company, New York, N.Y., a corporation of Delaware
Filed Dec. 28, 1962, Ser. No. 248,028
4 Claims. (Cl. 260—683.75)

This invention relates to an improved process for effecting catalytic conversions of hydrocarbons in liquid phase with fluid catalysts. More particularly, this invention relates to the conversion of hydrocarbons in liquid phase with a catalyst of the molten salt type, especially such as molten salt mixtures comprising molten salts of the Friedel-Crafts type.

The use of molten-salt, Friedel-Crafts type catalysts for the conversion of hydrocarbons, either alone or in the presence of such added promoters as hydrogen halides, organic halides, etc., is well known. For example, the catalyst is applicable to the cracking of hydrocarbons such as naphthas, kerosenes, gasolines, etc., to hydrocarbons of lower molecular weight; to the polymerization of olefins to form higher molecular weight hydrocarbons in the gasoline or lubricating oil boiling range; to the alkylation of isoparaffinic or aromatic hydrocarbons throughout a wide boiling range, e.g., for the manufacture of ethylbenzene by alkylation of benzene with ethylene; to the isomerization of normal paraffins and waxes; and to the treatment of lubricating oils with aluminum chloride.

With the commercial development of these processes using molten salt catalyst, it has become necessary to use multiple reactors in the larger units because of design limitations, reactor size, etc. It is difficult to establish and maintain uniform catalyst composition among the several reactors. As composition of the catalyst changes and becomes unbalanced among the several reactors, overall selectivity and conversion declines. Moreover, once a reactor is out of balance in regard to the desired catalyst composition, it is extremely difficult to rebalance catalyst composition using past practice (which will be described in detail hereafter).

Figure 1:
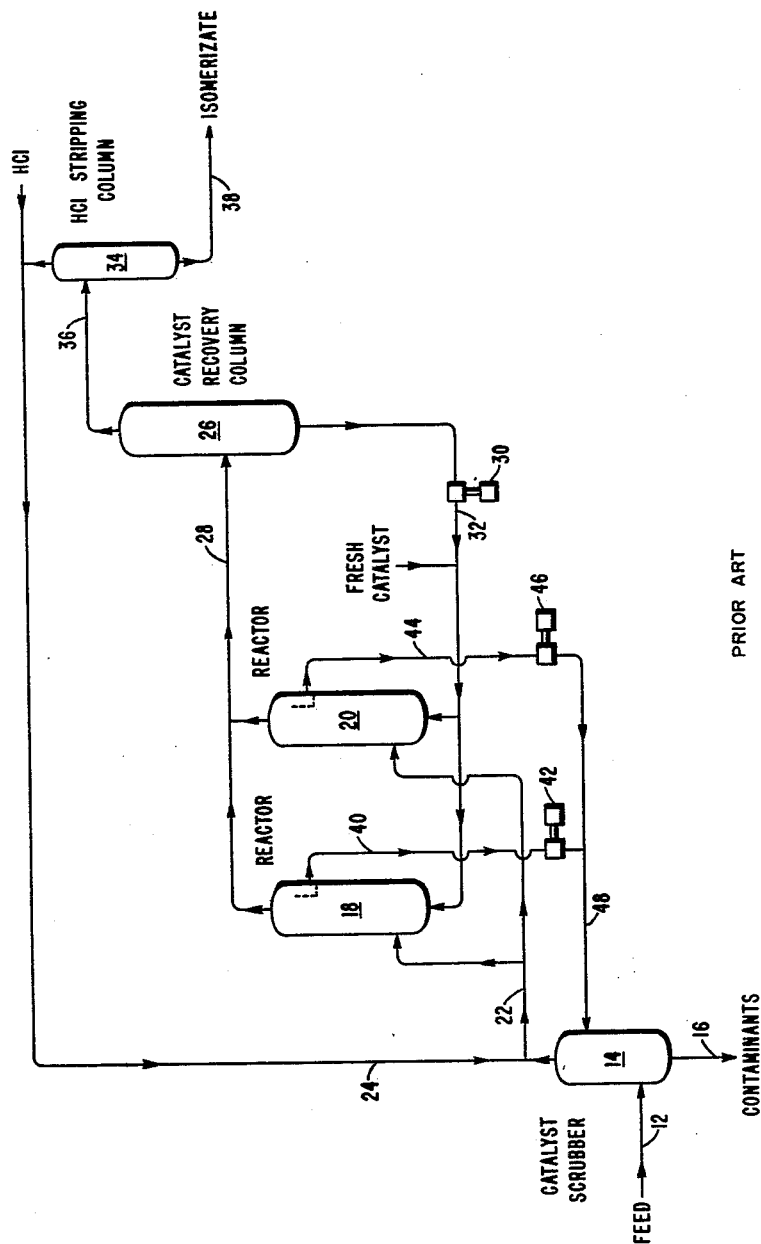
Figure 4:
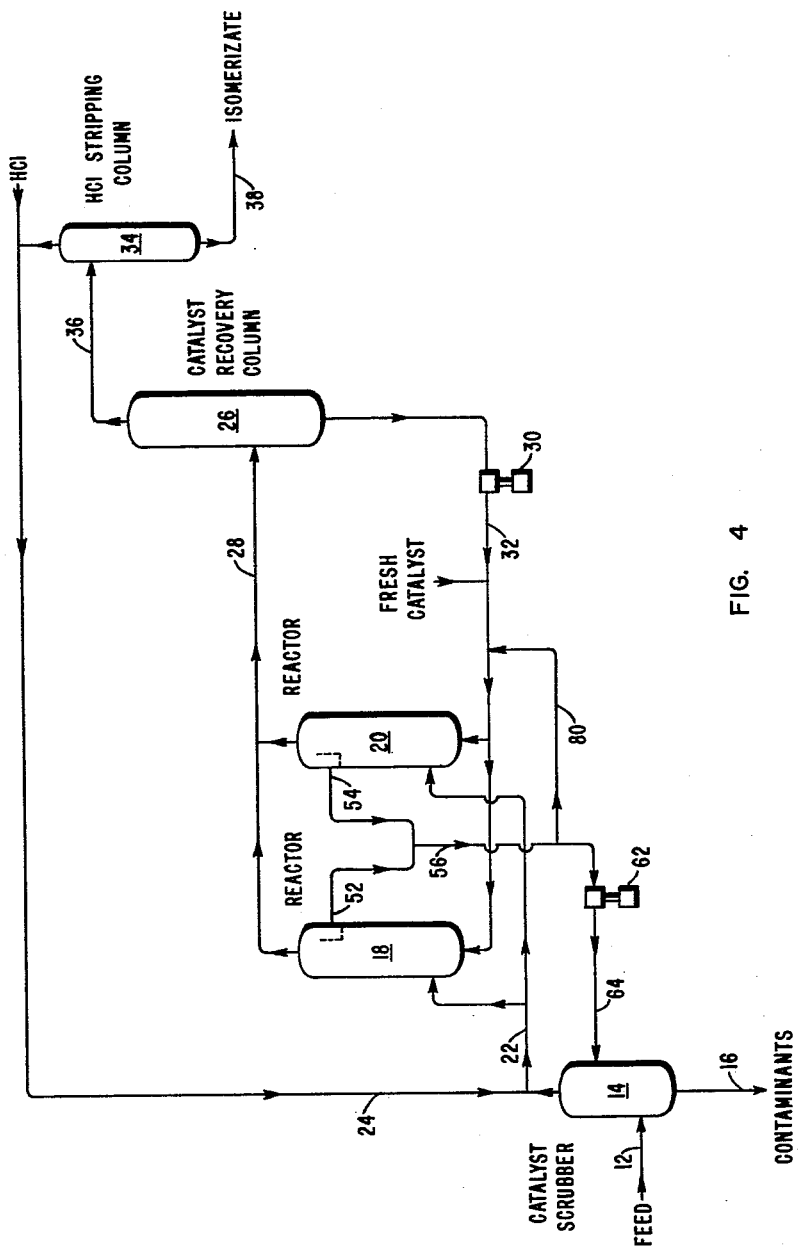

In accordance with the present invention, an external catalyst gravity circulation loop is provided wherein the catalyst from each of the several reactors is intermingled and returned to each of the several reactors. In a preferred embodiment, the combined catalyst is mixed with recycle catalyst (from, for example, a catalyst recovery column) before being returned to the individual reactors. A portion of the mixed catalyst can be rejected to a catalyst scrubber through a single pump. In the practice of the invention, uniform catalyst composition is realized for maximum conversion and selectivity. These and further advantages will be apparent to those skilled in the art from the following detailed description made with reference to the drawing, consisting of 4 figures. FIGURE 1 is a flow diagram showing prior practice. FIGURES 2, 3, and 4 are flow diagrams showing several preferred embodiments of the process the invention.

While the invention is generally applicable to any multiple-reactor, hydrocarbon-conversion process wherein the conversion of hydrocarbon is effected in a reaction zone containing a hydrocarbon-catalyst emulsion, it will be described and compared in detail as applied, in a two-reactor unit, to liquid phase isomerization of normal butane with an aluminum chloride-antimony trichloride molten salt catalyst.

Referring now to FIGURE 1 which shows prior practice, a dry normal butane fraction is introduced through line 12 into the bottom of catalyst scrubber 14 and rises through this scrubber countercurrently to catalyst pumped from the reaction zone as described more fully below. Ancillary equipment such as compressors, valves, control mechanisms, heat exchangers, etc., which are obvious to those skilled in the art are not shown. The catalyst contains aluminum chloride, antimony trichloride and an aluminum chloride-hydrocarbon sludge formed by undesirable side reactions. Aluminum chloride and antimony trichloride are dissolved in the hydrocarbon. The sludge, which is insoluble in hydrocarbon, and other contaminants such as corrosion products are removed from the scrubbing zone through line 16. The hydrocarbon, now containing dissolved catalyst components, is passed to reactor 18 and reactor 20 via line 22 together with hydrogen halide from line 24. The reactors can suitably be of a stirred type which has been used in commercial practice but are preferably vertical towers such as described in Thomas, U.S. Patent 2,983,775, issued May 9, 1961. The tower reactor contains, as a lower zone, an emulsion of hydrocarbon-in-molten salt catalyst (generally called a pool of catalyst) and an upper settling zone containing mainly hydrocarbon. The catalyst is a molten salt mixture of antimony trichloride and aluminum chloride in appropriate proportions of from about 84 to about 98% by weight antimony trichloride and from about 16 to about 2% by weight aluminum chloride Temperature in the reaction zone can range from a minimum temperature at which the catalyst can be maintained to the molten state up to approximately 210° F. The isomerization can be carried out at higher temperatures but low temperatures result in a more desirable yield structure. The pressure in the reaction zone conventionally varies from the pressure required to maintain the hydrocarbon primarily in the liquid phase up to any desirable superatmospheric pressure. Pressures from about 120 to about 500 p.s.i.g. generally are suitable.

Reactor effluent containing reacted hydrocarbon (generally referred to as isomerizate) and dissolved and entrained catalyst components enters catalyst recovery column 26 through line 28. The catalyst recovery column is suitably a conventional distillation column. Vapor pressure of the antimony trichloride and aluminum chloride is quite low; and therefore, separation from the isomerizate is easily effected. Liquid catalyst which consists primarily of antimony trichloride is withdrawn as column bottoms and recycled by pump 30 through line 32 to the reaction zones. As it becomes necessary to replace catalyst lost in the process fresh catalyst can be added to the system using the recycle catalyst stream. Isomerizate is passed overhead, cooled to condense hydrocarbon therein and introduced into HCl stripping column 34 via line 36. Hydrogen chloride is recovered overhead and recycled via line 24 to the reaction zone. Isomerizate is removed as a bottom product through line 38. It is desirable to give the isomerizate a caustic treatment and water wash to remove any residual hydrogen chloride and traces of catalyst.

As mentioned above, catalyst is pumped from the reaction zone to catalyst scrubber 14 via line 48. Reactors are generally provided with drawoff means such as weirs to allow separation of hydrocarbon from catalyst. The catalyst drawoff can be located for example in a tower reactor below the hydrocarbon and emulsion interface, or it can be in a separate vessel such as the practice when using stirred reactors. A separate drawoff line and pump is provided for each reactor (e.g., catalyst is withdrawn from reactor 18 via line 40 using pump 42 and catalyst is withdrawn from reactor 20 via line 44 using pump 46). Catalyst pumps are difficult to regulate and require considerable maintenance. And there is no precise control on the catalyst activity of the individual reactor.

Catalyst composition becomes unbalanced as a result of numerous causes. For example it is practically impossible to charge the reactors initially with the same catalyst compositions. When the unit is brought onstream the catalyst containing a greater amount of aluminum chloride produces more sludge and lighter hydrocarbon than the other catalyst composition. The presence of sludge lowers the specific gravity of the hydrocarbon-catalyst emulsion within the reactor. More catalyst (primarily antimony trichloride) will be recycled from the catalyst recovery column to the reactor which contains hydrocarbon-catalyst emulsion having the lowest gravity. (Catalyst circulation is generally effected by positive displacement pumps; consequently the amount of catalyst distributed to each reactor is regulated manually through a manifold and by piping design and not by flow meters.) Thus, the reactors tend to become even more unbalanced in regard to active catalyst composition. Further, when one of the catalyst withdrawal pumps is shut down for maintenance, sludge will build up in the reactor. Again the sludge affects the gravity of the hydrocarbon-catalyst emulsion within the reactor, resulting in further maldistribution of recycle catalyst. Also in any system it is difficult to precisely balance pressures between the individual reactors. The result of unbalanced catalyst composition is poor overall conversion and selectivity.

Now in accordance with the present invention, as shown in one embodiment in FIGURE 2, catalyst, having a specific gravity greater than the hydrocarbon-catalyst emulsion in the reactor, is withdrawn from an upper point of the hydrocarbon-catalyst emulsion zone in reactors 18 and 20 via lines 52 and 54, intermingled in line 56, and a portion of the intermingled catalyst is returned to a lower point of each of the several reactors via lines 58 and 60. The withdrawal point is generally located in the emulsion zone a short distance, e.g., from about 2 to about 4 feet, below the interface between the hydrocarbon settling zone and the emulsion zone. Separation means such as an internal weir wherein hydrocarbon separates from the catalyst is provided at the withdrawal point so that the withdrawn catalyst has a specific gravity greater than the specific gravity of the emulsion in the reactor. As a result of this difference in specific gravity, there is a natural circulation down the line and back into the bottom of the reactor. The rate of catalyst turnover is influenced by variables such as the difference in specific gravity; the vertical distance between the catalyst withdrawal point and catalyst return point (which, together with gravity difference, primarily, determines the driving force for the gravity circulation); the amount of energy necessary for mixing; the line hydraulics, etc. A turnover rate of from about 2 to about 15 times per day can be realized in a butane isomerization plant. This natural circulation and mixing in the common line serves to maintain uniform catalyst composition throughout the reaction system. For example, catalyst having a specific gravity of about 2.4 is withdrawn through one-inch lines from the butane-catalyst emulsion zone in each tower reactor. The height of the emulsion in each reactor is about 35 feet. The specific gravity of the emulsion is about 1.9. The catalyst from the reactors is intermingled in a two-inch line and a portion of the intermingled catalyst is returned into the bottom of each reactor. The catalyst inventory within each reactor is turned over approximately 10 to 11 times per day in such a system.

A portion of the mixed catalyst can be rejected to catalyst scrubber 14 via line 64 using pump 62. Only a single reject catalyst pump is required rather than one per reactor which was required in prior practice.

In another preferred embodiment of the invention, as shown in FIGURE 3, catalyst containing hydrocarbon is withdrawn from emulsion zone in each of the several reactors and introduced into a phase separation zone 70 through lines 52 and 54. While emulsion can be withdrawn from the reactor, it is preferred to provide separation means such as an internal weir at the catalyst withdrawal point. Hydrocarbon is separated from catalyst components in this zone and returned to the hydrocarbon settling zone through lines 72 and 74 or the hydrocarbon can be introduced into reactor effluent line 28, or using pressure control means, introduced into the catalyst recovery column. These latter alternative flows are not shown in the figure. The removal of hydrocarbon increases the gravity of the circulating catalyst and less isoparaffin is recycled into the inlet of the reactors via line 56 as described above. This results in more effective circulation and favors the equilibrium of the isomerization reaction.

In another preferred embodiment of the invention as shown in FIGURE 4, the circulating catalyst is mixed via line 80 with recycle catalyst pumped from catalyst recovery column 26 through line 32. The recycle catalyst can be used to add fresh catalyst to the system such as by heating the fresh catalyst in a vessel (generally called a saturator) and then dissolving the fresh catalyst in the recycle catalyst. The combined streams are returned to the several reactors. The turnover of the catalyst composition by natural circulation and redistribution of the catalyst together with the recycle catalyst serves to maintain substantially uniform catalyst composition between the individual reactors. This results in superior overall conversion and selectivity. Some of the additional advantages of the invention over conventional operation are (1) the problem of balancing catalyst scrubber pump flow is avoided, (2) maintenance is required on only a single catalyst scrubber pump rather than multiple pumps and (3) the natural-circulation rate is substantially greater than the catalyst-withdrawal rate experienced in the past; thus the tendency for flow stoppage by vapor lock in piping is reduced.

I claim as my invention:

1. In a process for the isomerization of hydrocarbons with a molten salt catalyst wherein hydrocarbon feeds of essentially the same composition are passed upwardly through at least two separate parallel reaction zones, each reaction zone containing a lower zone comprising hydrocarbon-catalyst emulsion and an upper settling zone, the improvement which comprises maintaining substantially uniform catalyst composition among the separate reaction zones by withdrawing catalyst having a specific gravity greater than the emulsion from an upper point of the emulsion zone in each of the reaction zones, comixing the catalyst withdrawn from each of the reaction zones, and returning portions of the comixed catalyst by gravity flow to each of the reaction zones.

2. The process of claim 1 wherein the catalyst is molten aluminum chloride-antimony chloride mixture.

3. In a process for the isomerization of hydrocarbons with a molten salt catalyst wherein hydrocarbon feeds of essentially the same composition are passed upwardly through at least two separate parallel reaction zones, each reaction zone containing a lower zone comprising hydrocarbon-catalyst emulsion and an upper settling zone, effluents from the reaction zones are separated in a fractionation zone into a vapor phase containing isomerization product and a catalyst phase, and the catalyst phase is recycled to the reaction zones, the improvement which comprises maintaining substantially uniform catalyst composition among the separate reaction zones by withdrawing catalyst having a specific gravity greater than the emulsion from an upper point of the emulsion zone in each of the reaction zones, mixing the withdrawn catalyst with the recycled catalyst, and returning a portion of the mixture to a lower point in each of the reaction zones.

4. The process of claim 3 wherein the catalyst is molten aluminum chloride-antimony chloride mixture.

References Cited in the file of this patent
UNITED STATES PATENTS

| | | |
|---|---|---|
| 2,439,301 | Hudson et al. | Apr. 6, 1948 |
| 2,502,008 | Hudson et al. | Mar. 28, 1950 |
| 2,983,775 | Thomas | May 9, 1961 |